United States Patent
Cheong

(10) Patent No.: US 8,011,387 B2
(45) Date of Patent: Sep. 6, 2011

(54) PRESSURE CONTROL DEVICE FOR HEAVY EQUIPMENT

(75) Inventor: Hae Kyun Cheong, Pusan (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 637 days.

(21) Appl. No.: 11/823,087

(22) Filed: Jun. 26, 2007

(65) Prior Publication Data
US 2008/0078285 A1    Apr. 3, 2008

(30) Foreign Application Priority Data
Sep. 28, 2006  (KR) .................. 10-2006-0094810

(51) Int. Cl.
*F15B 13/042*  (2006.01)

(52) U.S. Cl. ............ 137/625.6; 137/625.66; 137/625.68

(58) Field of Classification Search ............. 137/625.65, 137/625.67, 625.6, 625.69, 625.66, 625.68
See application file for complete search history.

(56) References Cited

U.S. PATENT DOCUMENTS

| | | | | |
|---|---|---|---|---|
| 3,267,965 A | * | 8/1966 | Kroffke | 137/625.64 |
| 4,478,250 A | * | 10/1984 | Lukasczyk et al. | 137/625.65 |
| 4,729,408 A | * | 3/1988 | Coutant | 137/637.1 |

* cited by examiner

*Primary Examiner* — Craig M Schneider
(74) *Attorney, Agent, or Firm* — Ladas & Parry LLP

(57) ABSTRACT

A pressure control valve for heavy equipment. The pressure control valve can smoothly operate a working device having a high load pressure by limiting a supply of hydraulic fluid to a working device having a low load pressure in the case of simultaneously operating a plurality of working devices in a hydraulic circuit in which a plurality of control valves (e.g., a boom control valve and a bucket control valve) are connected in parallel to a single hydraulic pump.

1 Claim, 4 Drawing Sheets

PRESSURE CONTROL DEVICE FOR HEAVY EQUIPMENT

CROSS-REFERENCE TO RELATED APPLICATION

This application is based on and claims priority from Korean Patent Application No. 10-2006-0094810, filed on Sep. 28, 2006 in the Korean Intellectual Property Office, the disclosure of which is incorporated herein in its entirety by reference.

BACKGROUND OF THE INVENTION

1. Field of the Invention

The present invention relates to a pressure control device for heavy equipment which can distribute and supply hydraulic fluid fed from a hydraulic pump to a plurality of working devices having different load pressures, such as a boom and a bucket, in the case of simultaneously operating the working devices having different operating pressures using a single hydraulic pump.

More particularly, the present invention relates to a pressure control valve for heavy equipment which can smoothly operate a working device having a high load pressure by limiting a supply of hydraulic fluid to a working device having a low load pressure in the case of simultaneously operating a plurality of working devices in a hydraulic circuit in which a plurality of control valves (e.g., a boom control valve and a bucket control valve) are connected in parallel to a single hydraulic pump.

2. Description of the Prior Art

Generally, in the case of simultaneously operating a plurality of working devices (e.g., a boom and a bucket) in a hydraulic circuit in which a plurality of control valves for the working devices are connected in parallel to a single hydraulic pump, the flow rate of hydraulic fluid being supplied from the hydraulic pump to the bucket having a low load pressure becomes lower than the flow rate of hydraulic fluid being supplied to the boom having a relatively high load pressure. Since this makes it impossible to operate the boom smoothly, the flow rate of the hydraulic fluid being supplied to the bucket is compulsorily adjusted.

SUMMARY OF THE INVENTION

Accordingly, the present invention has been made to solve the above-mentioned problems occurring in the prior art while advantages achieved by the prior art are maintained intact.

One object of the present invention is to provide a pressure control device for heavy equipment that can smoothly operate a plurality of working devices having different operating pressures in the case of simultaneously operating the working devices connected in parallel to a single hydraulic pump.

In order to accomplish the object, there is provided a pressure control device for heavy equipment, according to one aspect of the present invention, which includes a valve body having an input port, an output port, and a drain port, formed thereon; a spool, slidably installed in the valve body, for being shifted to connect the input port to the output port in response to a pressure obtained by adding an elastic force of a valve spring to a pressure being applied from the input port to a diaphragm of a first piston that is elastically supported in a first back chamber, and being shifted to disconnect the input port from the output port in response to a pressure being applied from the output port to a diaphragm of a second piston installed in a second back chamber; and a signal pressure port for applying a signal pressure to a diaphragm of the spool located in a third back chamber formed in the valve body, disconnecting the input port from the output port by shifting the spool in response to the pressure in the second back chamber and the signal pressure, and returning the pressure in the output port to the drain port; wherein the spool is shifted, corresponding to the signal pressure applied from an outside to the third back chamber, to control the operating pressure being applied from the input port to the output port.

The pressure control device for heavy equipment according to one aspect of the present invention may further includes a first land part, formed on a periphery of the spool, for connecting the input port to the output port; a first passage, formed through the spool, for connecting the first land part to the first back chamber and supplying the hydraulic fluid fed from the input port to the first back chamber; a second land part, formed on the periphery of the spool, for connecting to the drain port; and a second passage for supplying the hydraulic fluid fed from the input port to the second back chamber, and connecting the output port to the drain port when the spool is shifted.

In another aspect of the present invention, there is provided a pressure control device for heavy equipment, according to one aspect of the present invention, which includes a valve body having an input port, an output port, and a drain port, formed thereon; a spool, slidably installed in the valve body, for being shifted to connect the input port to the output port in response to a pressure obtained by adding an elastic force of a valve spring to a pressure being applied from the input port to a diaphragm of a first piston that is elastically supported in a first back chamber, and being shifted to disconnect the input port from the output port in response to a pressure being applied from the output port to a diaphragm located on an outer surface of the spool; and a signal pressure port for applying a signal pressure to a diaphragm of the spool located in a third back chamber formed on the valve body, disconnecting the input port from the output port by shifting the spool in response to a pressure acting upon the diaphragm located on the outer surface of the spool and the signal pressure, and returning the pressure in the output port to the drain port; wherein the spool is shifted, corresponding to the signal pressure applied from an outside to the third back chamber, to control the operating pressure being applied from the input port to the output port.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 1:
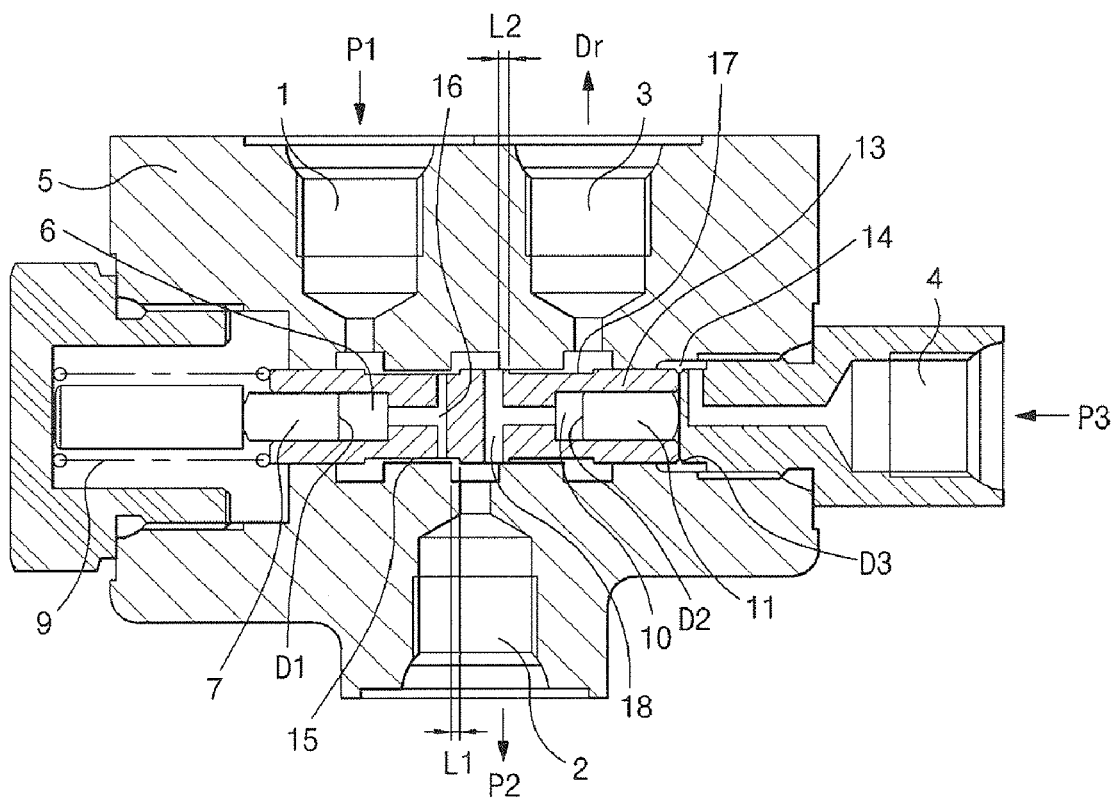
FIG. 1 is a sectional view of a pressure control device for heavy equipment according to an embodiment of the present invention.
Figure 2:
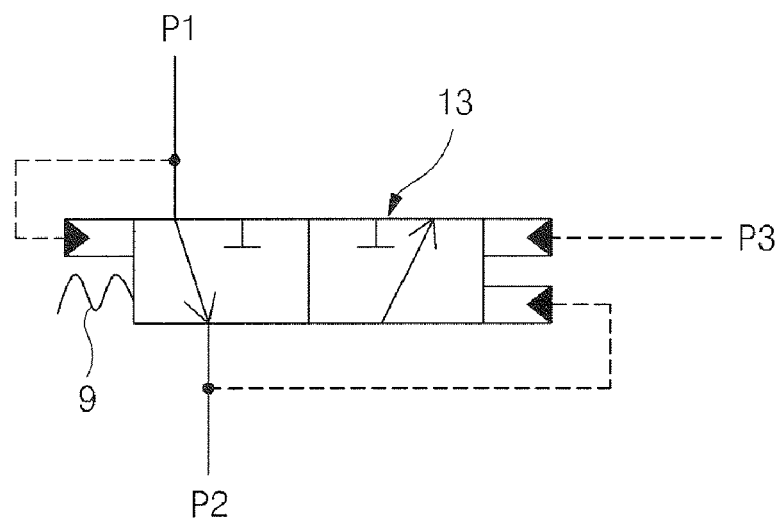
FIG. 2 is a hydraulic circuit diagram of the control device illustrated in FIG. 1.
Figure 3:
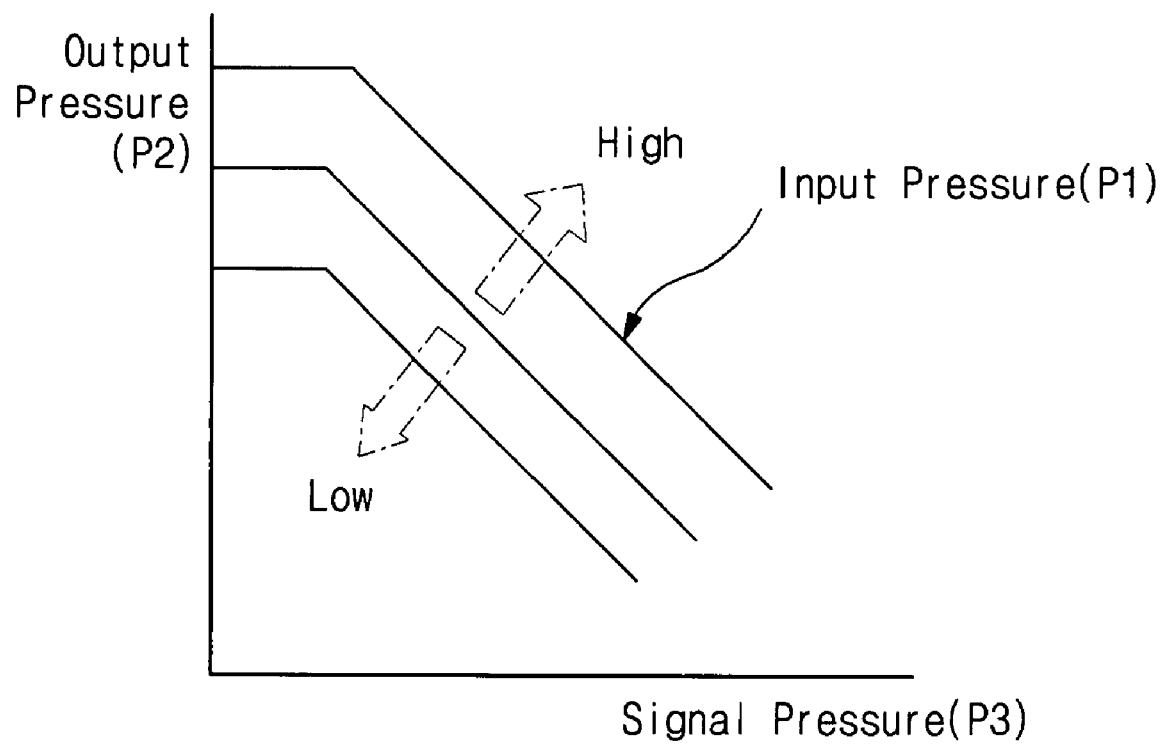
FIG. 3 is a view explaining the characteristic of a pressure control valve in the control device illustrated in FIG. 1.

As shown in FIGS. 1 to 3, a pressure control device for heavy equipment according to an embodiment of the present invention includes a valve body 5 having an input port 1, an output port 2, and a drain port 3, formed thereon; a spool 13, slidably installed in the valve body 5, for being shifted to connect the input port 1 to the output port 2 in response to a pressure obtained by adding an elastic force of a valve spring 9 to a pressure P1 being applied from the input port 1 to a fluid pressure receiving portion D1 of a first piston 7 that is elastically supported in a first back chamber 6, and being shifted to disconnect the input port 1 from the output port 2 in response to a pressure P2 being applied from the output port 2 to a fluid pressure receiving portion D2 of a second piston 11 installed in a second back chamber 10; and a signal pressure port 4 for applying a signal pressure P3 to a fluid pressure receiving portion D3 of the spool 13 located in a third back chamber 14 formed on the valve body 5, disconnecting the input port 1 from the output port 2 by shifting the spool 13 in response to the pressure P2 in the second back chamber 10 and the signal pressure P3, and returning the pressure P2 in the output port 2 to the drain port 3. The spool 13 is shifted, corresponding to the signal pressure P3 applied from an outside to the third back chamber 14, to control the operating pressure being applied from the input port 1 to the output port 2.

The pressure control device for heavy equipment according to one aspect of the present invention may further includes a first ring-shaped annular notch 15, formed on a periphery of the spool 13, for connecting the input port 1 to the output port 2; a first passage 16, formed through the spool 13, for connecting the first annular notch 15 to the first back chamber 6 and supplying the hydraulic fluid fed from the input port 1 to the first back chamber 6, a second ring-shaped annular notch 17, formed on the periphery of the spool 13, for connecting to the drain port 3 when the spool 13 is shifted, corresponding to the signal pressure P3 applied to the third back chamber 14; and a second passage 18 for supplying the hydraulic fluid fed from the input port 1 to the second back chamber 10, and connecting the output port 2 to the drain port 3 when the spool 13 is shifted, corresponding to the signal pressure P3 applied to the third back chamber 14.

Hereinafter, the operation of the pressure control device for heavy equipment according to an embodiment of the present invention will be described with reference to the accompanying drawings.

As shown in FIGS. 1 to 5, when the pressure P1 fed to the input port 1 passes through the output port 2, the spool 13 is shifted corresponding to the signal pressure P3 being applied from an outside to the spool 13 through the signal pressure port 4, so that the pressure P2 passing through the output port 2 can be controlled.

Specifically, the pressure P1 fed through the input port 1 is applied to the first back chamber 6 through the first annular notch 15 and the first passage 16.

In this case, the equilibrium relationship among a force which is applied to the first back chamber 6 of the spool 13 and presses the fluid pressure receiving portion D1 of the first piston 7, an elastic force Fs of the valve spring 9, a force which is applied to the second back chamber 10 of the spool 13 after passing through the input port 1 and presses the fluid pressure receiving portion D2 of the second piston 11, and a signal pressure P3 which is applied to the third back chamber 14 through the signal pressure port 4 and presses the fluid pressure receiving portion (i.e., the fluid pressure receiving portion D3 of the spool 13—the fluid pressure receiving portion D2 of the second piston 11) is given by the following equation.

$$(P1 \times D1) + Fs = (P2 \times D2) + P3(D3 - D2)$$

Accordingly, the pressure P2 in the output port 2 can be constantly controlled as the signal pressure P3 being applied to the signal pressure port 4, with respect to the pressure P1 of the input port 1.

In this case, if the signal pressure P3 is not applied from the outside to the signal pressure port 4, the pressure obtained by adding the elastic force of the valve spring 9 to the pressure P1 being applied to the first back chamber 6 is higher than the pressure P2 being applied to the second back chamber 10. Accordingly, the spool 13 is kept pressed to the extent of "L1" in the right direction as shown in the drawing by the pressures P1 and P2 that are applied to the first and second back chambers 6 and 10, respectively, and thus the pressure P1 in the input port 1 becomes equal to the pressure P2 in the output port 2.

On the other hand, if the pressure P1 in the input port 1 is kept constant and the signal pressure P3 being applied to the third back chamber 14 is increased, the pressure P1 in the input port 1 is kept equal to the pressure P2 in the output port 2 until the increased signal pressure P3 reaches an equilibrium point in the above-described force equilibrium relationship.

If the signal pressure P3 is further increased over the equilibrium point and the spool 13 is moved to the extent of "L1" in the left direction as shown in the drawing, the pressure P1 in the input port 1 and the pressure P2 in the output port 2 are intercepted from each other.

Figure 5:
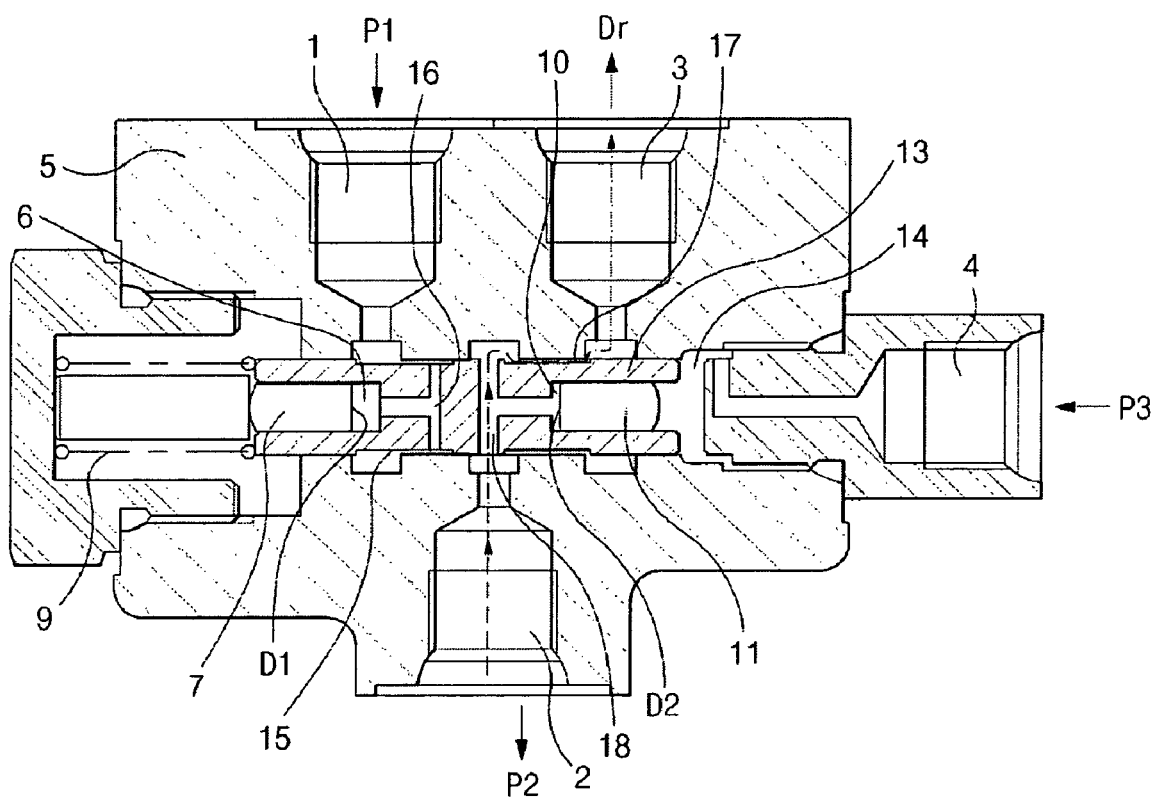
FIG. 5 is a sectional view of a pressure control device shown in FIG. 1, when the spool is shifted by the signal pressure.

Then, if the spool 13 is further moved to the extent of "L2" in the left direction as shown in the FIG. 5, the output port 2 is connected to the drain port 3 via the second annular notch 17, and thus the pressure P2 of the output port 2 is discharged to the drain port 3.

Accordingly, the pressure P2 in the output port 2 is reduced, and the spool 13 is moved in the right direction as shown in the FIG. 1. Thus, the pressure P1 in the input port 1 and the pressure P2 in the output port 2 are repeatedly intercepted from and connected to each other to keep the pressures in equilibrium.

As shown in FIG. 3, as the signal pressure P3 being applied to the third back chamber 14 is increased, the pressure P2 being applied from the input port to the output port 2 is reduced.

On the other hand, if the pressure P1 in the input port 1 is increased or decreased in a state that the signal pressure P3 being applied to the third back chamber 14 is kept constant, the pressure P1 in the input port P1 is kept a reduced pressure P2 by the signal pressure P3 being applied to the spool 13. In this state, if the pressure P1 is further increased, the spool 13 is moved in the right direction as shown in the drawing.

Consequently, the pressure P1 in the input port 1 and the pressure P2 in the output port 2 are repeatedly intercepted from and connected to each other to keep the pressures in equilibrium.

As shown in FIG. 3, if the pressure P1 in the input port 1 is increased or decreased in a state that the signal pressure P3 being applied to the third back chamber 14 is kept constant, the pressure P2 in the output port 2 is increased or decreased.

Figure 4:
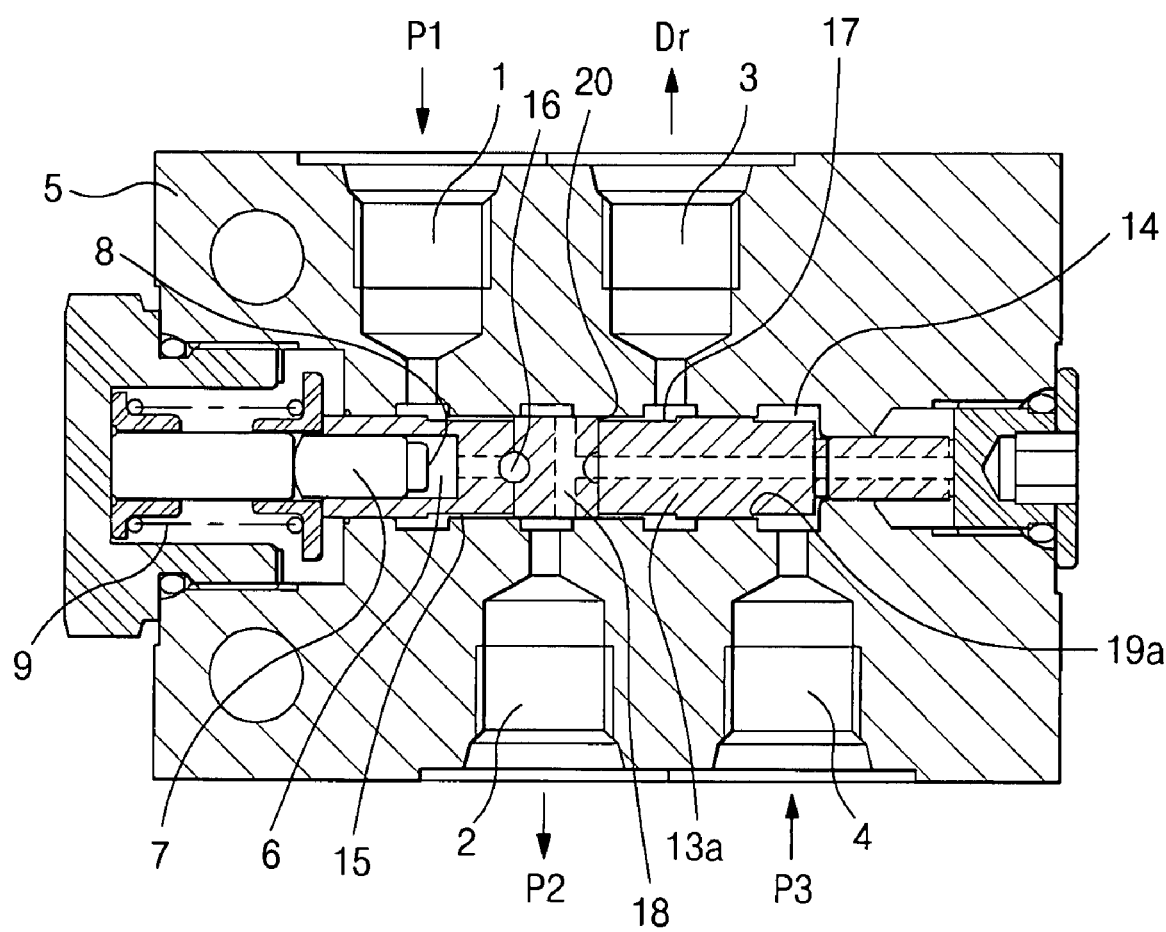
FIG. 4 is a sectional view of a pressure control device for heavy equipment according to another embodiment of the present invention.

As shown in FIG. 4, a pressure control device for heavy equipment according to another embodiment of the present invention includes a valve body 5 having an input port 1, an output port 2, and a drain port 3, formed thereon; a spool 13a, slidably installed in the valve body 5, for being shifted to connect the input port 1 to the output port 2 in response to a pressure obtained by adding an elastic force of a valve spring 9 to a pressure being applied from the input port 1 to a diaphragm 8 of a first piston 7 that is elastically supported by the valve spring 9 in a first back chamber 6, and being shifted to disconnect the input port 1 from the output port 2 in response to a pressure being applied from the output port 2 to a diaphragm 20 located on an outer surface of the spool; and a signal pressure port 4 for applying a signal pressure to a diaphragm 19a of the spool 13a located in a third back chamber 14 formed on the valve body 5, disconnecting the input port 1 from the output port 2 by shifting the spool 13a in response to a pressure acting upon the diaphragm 20 located on the outer surface of the spool 13a and a signal pressure P3, and returning the pressure in the output port 2 to the drain port 3.

The spool 13a is shifted, corresponding to the signal pressure P3 applied from an outside to the third back chamber 14 through the signal pressure port 4, to control the operating pressure being applied from the input port 1 to the output port 2.

In this case, the construction including the first piston 7 elastically supported in the first back chamber 6, the valve body 5 having the input port 1, the output port 2, and the drain port 3, and the third back chamber 14 to which the signal pressure P3 fed from the outside is applied through the signal pressure port 4, is substantially equal to that according to an embodiment of the present invention, the detailed description thereof will be omitted. Also, in the whole description of the present invention, the same drawing numerals are used for the same elements across various figures.

As described above, the pressure control device for heavy equipment according to the embodiments of the present invention has the following advantages.

In the case of simultaneously operating a plurality of working devices connected in parallel to a single hydraulic pump, it is possible to smoothly operate the working devices having different operating pressures, and thus the operation of the equipment is improved with the working efficiency thereof heightened.

Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A pressure control device for heavy equipment, comprising:
    a valve body having an input port, an output port, and a drain port, formed thereon;
    a spool, slidably installed in the valve body, for being shifted to connect the input port to the output port in response to a pressure obtained by adding an elastic force of a valve spring to a pressure being applied from the input port to a fluid pressure receiving portion of a first piston that is elastically supported in a first back chamber, and being shifted to disconnect the input port from the output port in response to a pressure being applied from the output port to a fluid pressure receiving portion of a second piston installed in a second back chamber; and
    a signal pressure port for applying a signal pressure to a fluid pressure receiving portion of the spool located in a third back chamber formed in the valve body, disconnecting the input port from the output port by shifting the spool in response to the pressure in the second back chamber and the signal pressure, and returning the pressure in the output port to the drain port;
    wherein the pressure control device further comprises:
    a first annular notch, formed on a periphery of the spool, for connecting the input port to the output port;
    a first passage, formed through the spool, for connecting the first annular notch to the first back chamber and supplying the hydraulic fluid fed from the input port to the first back chamber;
    a second annular notch, formed on the periphery of the spool, for connecting to the drain port, when the spool is shifted, corresponding to the signal pressure P3 applied to the third back chamber; and
    a second passage for supplying the hydraulic fluid fed from the input port to the second back chamber, and connecting the output port to the drain port when the spool is shifted, corresponding to the signal pressure P3 applied to the third back chamber;
    wherein the spool is shifted, corresponding to the signal pressure applied from an outside to the third back chamber, to control the operating pressure being applied from the input port to the output port.

* * * * *